(12) United States Patent
Hoffmann et al.

(10) Patent No.: US 6,267,138 B1
(45) Date of Patent: *Jul. 31, 2001

(54) METHOD AND MEANS FOR MONITORING A CONTROL APPARATUS

(75) Inventors: Heinfried Hoffmann, Frankfurt am Main; Joerg Kiesbauer, Eppertshausen, both of (DE)

(73) Assignee: Samson Aktiengesellschaft, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,162

(22) Filed: Jun. 5, 1998

(30) Foreign Application Priority Data

Jun. 5, 1997 (DE) .............................. 197 23 650

(51) Int. Cl.⁷ .............................. F16K 37/00; G01D 9/12
(52) U.S. Cl. .............................. 137/551; 73/168
(58) Field of Search .............................. 137/551, 552, 137/554; 73/168

(56) References Cited

U.S. PATENT DOCUMENTS

| 4,029,122 | * | 6/1977 | Jaegtnes | 137/551 |
| 4,274,438 | * | 6/1981 | La Coste | 137/551 |
| 4,523,286 | * | 6/1985 | Koga et al. | 137/551 X |
| 5,329,956 | * | 7/1994 | Marriott et al. | 137/554 X |
| 5,492,009 | * | 2/1996 | Kempf et al. | 137/551 X |
| 5,538,036 | * | 7/1996 | Bergamini et al. | 137/551 X |
| 5,616,829 | * | 4/1997 | Balaschak et al. | 137/551 X |

* cited by examiner

Primary Examiner—John Rivell
(74) Attorney, Agent, or Firm—Schiff Hardin & Waite

(57) ABSTRACT

The invention relates to a method and means for monitoring a control apparatus having at least one actuating drive, a valve, a spindle, and a positioner, whereby a reversal of direction of a valve spindle, by means of manipulated variable changes that are well-defined, reproducible and uniform, supplies useful information for the monitoring of the state of the control apparatus. For example, a comparison with target values and a diagnosis can take place by means of measurement and processing of valve positions (h) and the times (t) at which the valve positions are assumed, during the reversal motion. In addition, during times of uniform motion, the speed of movement or, respectively, in the case of predetermined valve positions, the allocated runtime, can additionally be determined. Moreover, given an inverted direction of motion further diagnosis possibilities can be supplied by means of repetition of the measurement and processing.

26 Claims, 2 Drawing Sheets

METHOD AND MEANS FOR MONITORING A CONTROL APPARATUS

BACKGROUND OF THE INVENTION

1. Field of the Invention

The invention relates to a method and means for monitoring a control apparatus having at least one actuating drive, a valve, a spindle, and a positioner.

The monitoring of control apparatuses for the ensuring correct operation thereof is of increasing importance, in the interest of lowering costs and increasing safety. Thus, for example, in order to increase efficiency it is desirable to prevent stoppage of process equipment due to component failure. For this purpose, timely exchange of components subject to wear is, for example, very important. However, premature exchange leads to unnecessarily high maintenance costs and temporary failures. For the optimization of maintenance and repair measures, it is thus necessary to carry out monitoring measures that provide information concerning the state of the equipment, in particular of the control apparatus and their components.

The possible sources of error can vary greatly, and comprise in particular the following known defects:

- incorrectly tightened and worn-out sealings (e.g., stuffing box packings);
- broken spindles;
- broken springs (in the membrane drive);
- torn membranes (in the membrane drive);
- low supply pressure (in electropneumatic positioners); and/or
- contamination of the air filter (in electropneumatic positioners).

Some proposals for the monitoring of control apparatus are already known. EP 0 637 713 discloses a diagnosis system that uses a processor, connected with various sensors, and an intelligent positioner, in order to emit an alarm signal in case the measured values deviate from previously measured characteristics. The sensors detect structure-borne noise spectra and the pressure at a safety stuffing box, but however can also detect the flow at the valve, the input pressure and the valve position. A disadvantage of this method is that in order to acquire all the parameters, a large family of characteristics must be recorded and stored beforehand. This requires both a large expense for the determination of the parameters that characterize the correct function. As a result, a processor with a large memory is required.

In EP 0 708 389, a method is described in which the valve position and the manipulated variables are measured and stored. The data is then adapted to a defined mathematical model, and for each component at least one critical parameter is selected so that a faulty component of the control apparatus is found by means of adapting (fit) of the current measurement data to the mathematical model with the aid of the calculated critical parameter. However, it is disadvantageous that this method depends heavily on the selected mathematical model and the suitable selection of the critical parameters. The formal specification of the model and of the critical parameters additionally requires a suitable selection of parameters, in order both to make the adaptation soluble sufficiently rapidly and with a reasonable expense and also to select the critical parameters so that they are informative and sensitive to disturbances. In principle, the method resembles the selection of characteristic lines, with a tolerance band for the correct functioning of the control apparatus. The critical parameter thereby defines the tolerance, and the calculations become a mathematical variation problem in the matching. The solution of this matching, in particular given a larger number of critical parameters, becomes a demanding mathematical problem, depending on the type of model. Above all, process-oriented realization, as is often required directly at the control apparatus with intrinsically safe electronics, presents further problems, which render the method non-practicable in many cases.

DE 42 33 301 specifies a positioner that enables the recognition of faulty functioning of the positioner or control apparatus. For this purpose, the occurrence of a significant change in target value is detected, and the time required for the approximation of the actual value to a corresponding target value is monitored, so that the comparison of the actual value with the target value enables the recognition of faulty functioning. The possibility of likewise determining the type of error with a positioner of this type can however be realized only with difficulty. The reliability of the monitoring is also limited in that the approximation of the actual value to the target value requires relatively long time periods, and disturbances or changes in the target value present during these times falsify the result, or render it totally unusable.

Another method for monitoring a control apparatus with an electropneumatic positioner is specified in DE 44 19 548, in which a test signal whose amplitude can be modified is superposed on the control pressure. The state of the control apparatus is inferred from the relationship between this test signal and the movement of the system to be controlled. By superposition of the test signal, this method does indeed enable the monitoring of the hysteresis, which identifies above all friction at a cone rod. However, the initial position for the execution of this method has to be a constant valve position, in order to determine the beginning of a movement. The method is thus usable only beginning from a rest position, not from a valve movement.

The German patent application P 196 43 297.9, which does not enjoy prior publication, also discloses a method and a means for monitoring control apparatus, whereby the time difference between the driving of a drive switch unit and the possible response of a position detector, allocated to the previous rest position of the control apparatus, is monitored. The state of the control apparatus is inferred therefrom. However, similar to the method according to DE 44 19 548, the rest position of the control apparatus is an initial requirement, which disadvantageously limits the scope of application.

SUMMARY OF THE INVENTION

An object of the present invention is thus to develop further the method of monitoring a control apparatus, and the corresponding means for monitoring a control apparatus, in such a way that the disadvantages of the prior art are overcome. In particular, an object of the present invention is to provide a method of monitoring a control apparatus which can be executed beginning from a state of motion of the control apparatus without the use of additional sensor equipment. Another object of the present invention is to provide such a method whereby the state of the control apparatus can be described as comprehensively as possible.

The above objects relating to the method of the present invention are inventively solved with the following steps:

a) determination of a first valve position at a first time;

b) production of a force by the actuating drive, on the basis of changes in manipulated variables, for the well-defined, reproducible, uniform movement in a first direction, without stopping, of the spindle connected to the valve body of the valve;

c1) modification of the manipulated variable for the actuating drive at the output of the positioner in such a way that a resulting force acts on the spindle that reverses the direction of movement of the spindle for the first time, whereby the changes in the manipulated variables are likewise well-defined, reproducible and uniform, but act in an opposed, second direction, and c2) determination of a second time, and of the second valve position appertaining thereto, when the first reversal of direction is triggered;

d) acquisition of a third time at which, due to unavoidable delays, the spindle reaches a third valve position after the first reversal of direction, said third position standing in a first defined relationship to the second valve position; and e) definition and determination of a first time period between the second time and the third time; and f) comparison of the first time period with a corresponding first target value for the determination of the operativeness of the control apparatus. It is thereby inventively preferred to carry out the following steps as well:

g) maintaining of the movement of the spindle after the first time period, and determination of a fourth valve position at a fourth time, as well as of a fifth valve position at a fifth time;

h) calculation of a first speed of the movement from the fourth as well as the fifth time and from the fourth as well as from the fifth valve position; and i) comparison of the determined first speed with a corresponding second target value, in order to determine the operativeness of the control apparatus. In an embodiment of the invention, the additional execution of the following steps is provided:

j) production of a force by the actuating drive on the basis of changes in the manipulated variables, for the well-defined, reproducible, uniform movement in the second direction, without stopping, of the spindle connected with the valve body of the valve, which second direction is opposed to the movement from the first time up to the triggering of the first reversal of direction;

k1) modification of the manipulated variable for the actuating drive at the output of the positioner in such a way that a resulting force acts on the spindle, reversing the movement of the spindle for the second time, whereby the changes in the manipulated variables are likewise well-defined, reproducible and uniform, but act in the first direction, and k2) determination of a seventh time, and of the seventh valve position appertaining thereto, upon triggering of the second reversal of direction;

k) acquisition of an eighth time, at which, due to unavoidable delays, the spindle reaches an eighth valve position after the second reversal of direction, said eighth position standing in a second determined relationship with the seventh valve position;

m) definition and determination of a second time period between the seventh time and the eighth time; and n) comparison of the second time period with a corresponding third target value, in order to determine the operativeness of the control apparatus. It is thereby preferred that in addition the following steps are executed:

o) maintaining of the movement of the spindle after the second time period, and determination of a valve position at a following time, as well as of a ninth valve position at a ninth time;

p) calculation of a second speed of the movement from the stated following time as well as from the ninth time, and from the valve positions appertaining thereto; and q) comparison of the determined second speed with a corresponding fourth target value, in order to determine the operativeness of the control apparatus.

In addition, the invention proposes that the second valve position coincides essentially with the third valve position.

According to the invention, it can also be provided that the seventh valve position essentially coincides with the eighth valve position.

In addition, it is preferred according to the invention that the valve position allocated to the triggering of the first reversal of direction essentially corresponds to the valve position allocated to the triggering of the second reversal of direction, whereby the direction of movement during the first reversal of direction is opposed to that during the second reversal of direction.

The invention also proposes that the changes in the manipulated variables occurring, respectively, directly before and after the first and/or second reversal of direction are essentially identical in type and amount.

It can be provided according to the invention that the beginning time and the ending time of the first time period have a determined chronological spacing to the second time or, respectively, to the third time, and/or at the beginning time and at the ending time of the first time period there exists a determined positional spacing of the appertaining valve positions to the valve position allocated to the triggering of the first reversal of direction.

It can also be provided according to the invention that the beginning time and the ending time of the second time period have a determined chronological spacing to the seventh time or, respectively, to the eighth time, and/or at the beginning time and at the ending time of the second time period there exists a determined positional spacing of the appertaining valve positions to the valve position allocated to the triggering of the second reversal of direction.

The invention further proposes that the beginning time of the first time period essentially coincides with the second time, and/or the final time of the first time period essentially coincides with the third time.

It is also proposed according to the invention that the beginning time of the second time period essentially coincides with the seventh time, and/or the final time of the second time period essentially coincides with the eighth time.

The invention further proposes that the beginning time of the first speed measurement essentially corresponds to the third time.

Advantageously, it can also be provided according to the invention that the beginning time of the second speed measurement essentially corresponds to the eighth time.

The inventive method is further characterized by a third and fourth reversal of direction, triggered at times between the first and second reversal of direction.

It is thereby inventively preferred that the time of the triggering of the third reversal of direction essentially coincides with the final time of the measurement of the first speed.

An embodiment of the invention is characterized in that the method is carried out during the normal control operation or closed-loop control of the control apparatus, in that the type of the movement of the spindle connected with the valve body is chronologically monitored, the measurement values for the valve position and the appertaining time are stored at least for short times, and, given the occurrence of a reversal of direction, the applicability of the method is checked and is executed if warranted.

Another embodiment is characterized in that the method is executed by temporarily shutting off the normal control operation of the control apparatus, and a test signal forces the movements of the spindle that are necessary for the execution of the method.

It can thereby be provided according to the invention that by means of the test signal the first and/or second reversal of direction is forced at the time at which a predetermined valve position is reached.

The invention further proposes that after the execution of the monitoring, the test signal brings the valve back into the valve position at the beginning of the monitoring.

It is likewise provided that for the identification of the operativeness of the positioner, a diagnosis takes place, indicating various components of the control apparatus.

The part of the object for carrying out a method according to the invention relating to the means is achieved in that the positioner comprises a sensor for the measurement of valve positions and a microprocessor, and in that the microprocessor is provided with a clock pulse and is connected with a memory unit as well as an output unit for error status messages, and in that valve positions, times and time differences, as well as corresponding target values, can be stored in the memory unit.

It is thereby provided according to the invention that when defects occur, the error status message comprises an indication of the type of the error.

It can further be provided that the signal connections are realized via a field bus system, and in that the analysis of error status signals via the field bus system is separate from the control apparatus.

The invention also proposes that the actuating drive is a pneumatic drive that can be driven for the realization of a defined uniform movement in a direction by an electropneumatic positioner with successive pneumatic pulses of equal length.

An embodiment of the invention is characterized in that the positioner is an electropneumatic positioner that comprises two valves, of which, for the realization of a defined uniform movement, only one is driven, in order to produce either air supply pulses or air extraction pulses.

Finally, it can also be provided according to the invention that uniform minimum air supply or air extraction pulses, which effect a continuous movement of the spindle, can be produced via the positioner.

The invention is thus based on the surprising finding that a reversal of direction of a valve spindle, by means of manipulated variable changes that are well-defined, reproducible and uniform, supplies items of information for the monitoring of the state of the control apparatus, in that a comparison with target values and a diagnosis can take place by means of measurement and processing of valve positions (h) and the times (t) at which the valve positions are assumed, during the reversal motion. In addition, during times of uniform motion, the speed of movement or, respectively, in the case of predetermined valve positions, the allocated runtime, can additionally be determined. Moreover, given an inverted direction of motion, further diagnosis possibilities can be supplied by means of repetition of the measurement and processing.

Other objects and advantages of the present invention will become apparent from reading the following detailed description and appended claims, and upon reference to the accompanying drawings.

BRIEF DESCRIPTION OF THE DRAWINGS

Further features and advantages of the invention apparent from the following specification, in which exemplary embodiments are specified in detail on the basis of schematic drawings.

In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
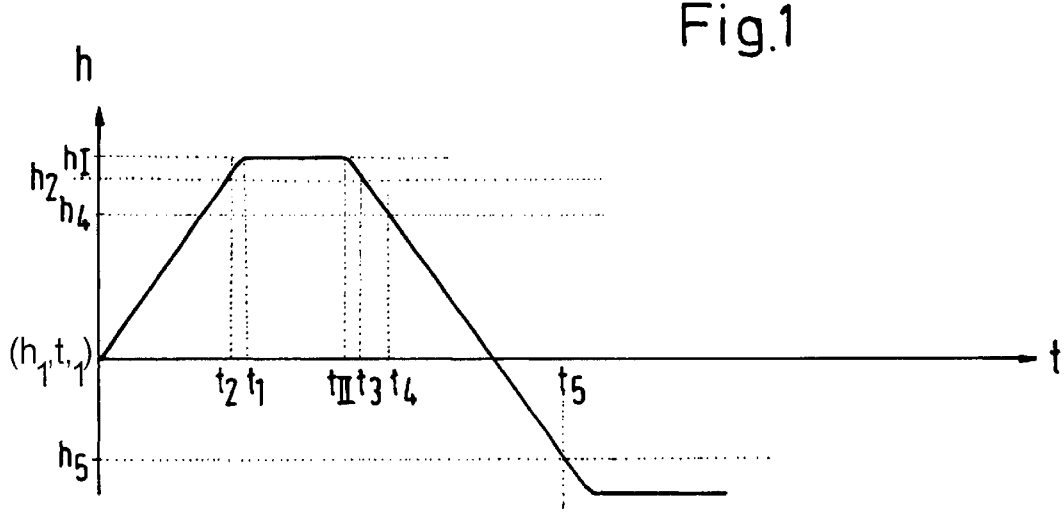
FIG. 1 illustrates the chronological curve of the valve position during the execution of a preferred method according to the invention.

In FIG. 1, the valve position is plotted dependent on time, in a coordinate system with time t as the abscissa and valve position h as the ordinate. The origin of the coordinate system is thereby chosen arbitrarily, and at the beginning of this inventive method a first valve position $h_1$ is determined at time $t_1$. A valve thereby moves with constant speed, without stopping, up to time $t_2$, at which the valve position $h_2$ is measured, which, together with the valve position $h_1$, defines the direction of motion during the beginning of the method. At time $t_2$, a positioner then modifies at its output the manipulated variable for an actuating drive, in such a way that a resulting force acts on a spindle, reversing the motion of the spindle. Due to delays that arise, due to inertia, for the production of the force modifications at the drive, the valve moves in the original direction beyond the valve position $h_2$, comes to a stop at time $t_I$ at the valve position $h_I$, and subsequently (i.e., from time $t_{II}$) moves in the opposite direction. The valve position $h_2$ is thereby again reached, at time $t_3$.

The triggering of the reversal of direction at time $t_2$ takes place in that the positioner produces modifications in the manipulated variable of the same type and same amount as during the initial movement before the reversal of direction, but with an inverted sign. The time required for the reversal of direction is thereby for example characteristic for the friction of a stuffing box, but broken drive springs also change this time. The reversal of direction leads to a stoppage of the valve, as shown in FIG. 1, whereby the valve position $h_I$ during the reversal process, which position is marked as an infinitely broad plateau, is characterized more precisely by the time interval between the times $t_I$ and $t_{II}$ than by that between times $t_2$ and $t_3$. Furthermore, the times $t_I$ and $t_{II}$ have a fixedly set chronological spacing to the times $t_2$ and $t_3$ in this exemplary embodiment. The target values allowable for the correct functioning, and the allowable tolerances thereof for said time interval between the times $t_I$ and $t_{II}$, can be determined in an initial initialization run, or can be determined from general theoretical or empirical relationships. The quantity formed from the time interval between the times $t_I$ and $t_{II}$ for comparison with a target value can thereby of course be a function such as for example an integral over the controlled variable: According to the direction and size of the deviation from the respective target value, as a result of the inventive method one or more signals are produced, which indicate(s) for example correct functioning, a spring break in the drive, a too-tightly fastened or worn-out stuffing box, a worn-out connection between the positioning drive and the valve, a blocked valve, etc.

During the further movement, the speed of the movement can be calculated by measuring two times $t_4$, $t_5$ upon the reaching of two further valve positions $h_4$, $h_5$. For this purpose, in a simple embodiment of the invention only the time period between times $t_4$ and $t_5$ need be determined, if the valve positions $h_4$ and $h_5$ are predetermined. By comparison of the calculated speed or, respectively, said time interval with a corresponding target value, additional information concerning the state of the control apparatus can be indicated.

Figure 2:
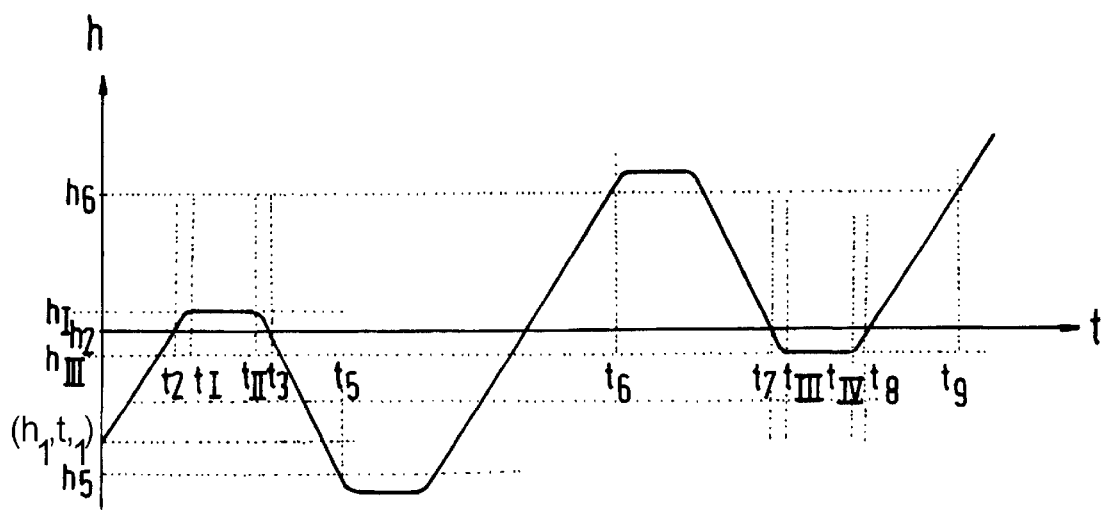
FIG. 2 illustrates the chronological curve of the valve position during the execution of an alternative preferred method according to the invention.

Similar to FIG. 1, FIG. 2 shows a coordinate system in which the valve position h is plotted dependent on time t. The plotted curve schematically shows the valve position during the execution of an alternative method of the invention, forced by a test signal. The method according to the second exemplary embodiment comprises the curve specified with reference to FIG. 1, and is expanded in that a second reversal of direction, namely at time $t_7$, from the direction opposite that at time $t_2$, is forced and evaluated, for the valve position $h_2$ as well. In order to be able to approach the valve position $h_2$ twice from different directions, in addition at least two additional reversals of direction are required at times $t_5$ and $t_6$, with valve positions $h_5$ and $h_6$.

According to the inventive method shown in FIG. 2, the valve position $h_1$ is determined at the beginning, i.e. at time $t_1$. The valve moves without stopping and at constant speed until time $t_2$, at which time the reversal of direction is triggered. The time interval between times $t_2$ and $t_3$ is again a criterion for the operativeness of the control apparatus; in particular, the time interval between times $t_I$ and $t_{II}$ is used as a value for comparison with a target value that identifies the correct function. For the determination of the speed, the time interval from $t_3$ to $t_5$ is used directly thereafter, whereby the valve positions $h_2$ and $h_5$ are predetermined, and formation of a quotient can thereby be avoided. The changes of direction triggered at times $t_5$ and $t_6$ are not evaluated, but rather serve only for the reaching of the valve position $h_2$ with a direction of motion opposite to that at time $t_2$. The time interval between the times $t_7$ and $t_8$, or, respectively, $t_{III}$ and $t_{IV}$, with valve position $h_{III}$, serves for the determination of the state of the control apparatus, as does the time interval between times $t_2$ and $t_3$, or, respectively, $t_I$ and $t_{II}$. After the reversal of direction, for the determination of the speed in the inverted direction the time interval between times $t_8$ and $t_9$ is measured, with valve positions $h_2$ and $h_6$.

The reversal times and runtimes can comprise different target values for different directions, particularly given pneumatic actuating drives. For example, a lowered supply pressure in pneumatic actuating drives in the direction of motion for which an increase in the regulating pressure is necessary changes both the reversal time and also the speed of motion, while in the direction of motion for which a lowering of the regulating pressure takes place, in principle no influence is present. On the other hand, a modified stuffing box friction produces different reversal times in both directions, but almost unchanged speeds of motion. Thus, given noticed deviations of the target values, the type and location of a defect can be inferred particularly advantageously on the basis of various direction-dependent deviations. For a diagnosis function, it is provided according to the invention to store the effects of typical errors, and combinations of target value deviations arising therefrom, in a memory unit, in the manner of an error sample to be checked.

Figure 3:
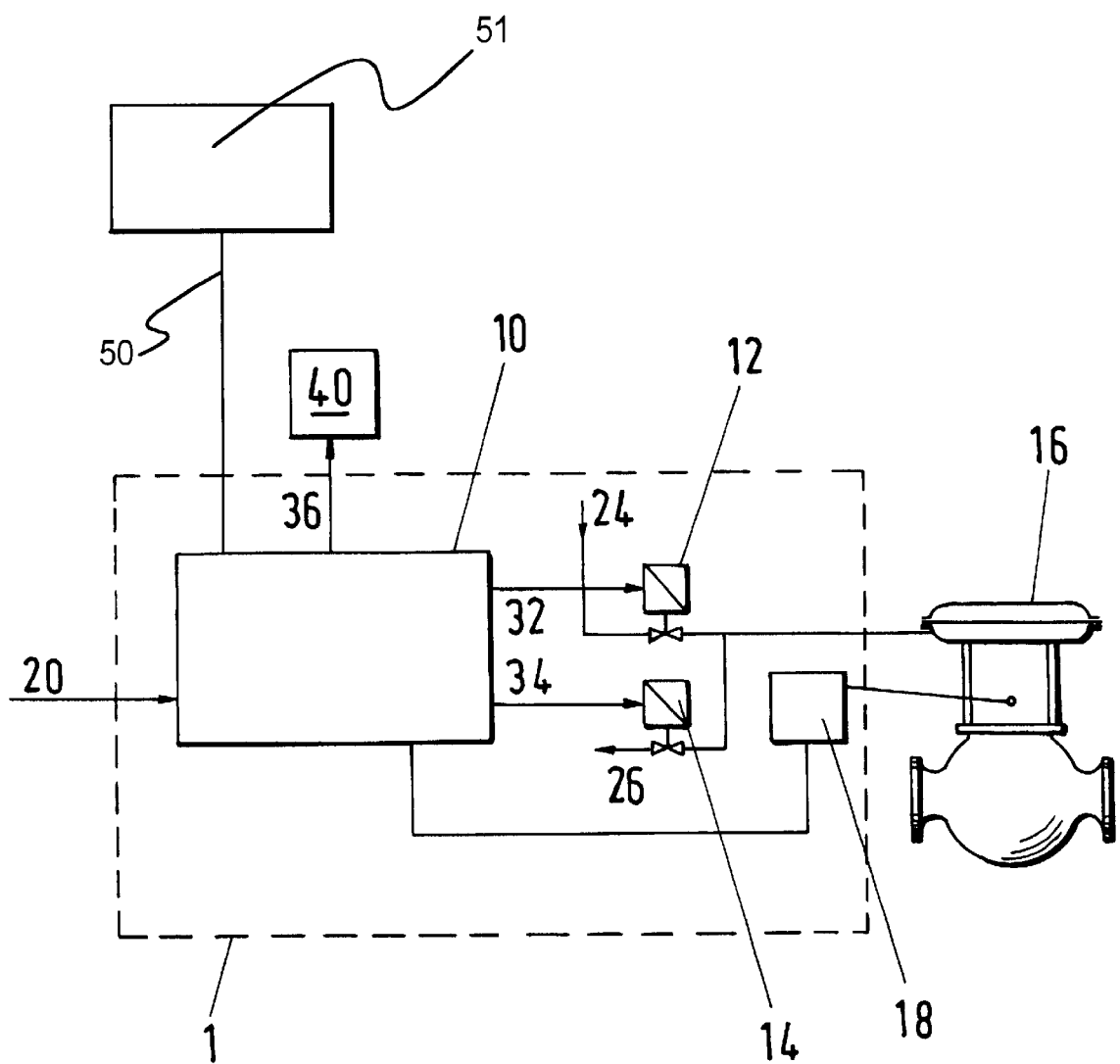
FIG. 3 illustrates a representation of an inventive means.

FIG. 3 shows an inventive means for executing the just-described method for monitoring a control apparatus 16 having at least one actuating drive (not shown), a valve (not shown) and a positioner 1. The means is thereby provided with a sensor 18 for measuring the valve position and a unit 10 comprising a microprocessor and a memory unit. The microprocessor 10 processes the measured times and valve positions, carries out comparisons with target values stored in the memory unit via a target value input 20, and determines therefrom an error status signal that is transmitted to an output unit 40 via an error status signal output 36.

An advantageous means according to the invention has an electropneumatic positioner 1 that produces air supply impulses that are minimal for the production of defined, reproducible motions, or, after inversion of the direction of motion, produces air extraction impulses. For electropneumatic positioners I that have two separate valves 12 and 14 for aeration and deaeration, this means a brief driving of one or the other valve 12 or, respectively, 14 via an air supply signal output 32 or, respectively, an air extraction signal output 34. The valve 12 thereby switches the connection to the air supply input 24 and the valve 14 correspondingly switches the air extraction output 26.

The means can be constructed in an additionally advantageous manner if the signal connections are realized via a field bus system 50, and the analysis of the error status signal for possible causes of error, as well as combinations thereof, is separated from the control apparatus 16 via the field bus system, and for example takes place on a computer 51 in the control room (not shown).

The features of the invention disclosed in the above specification, in the claims and in the drawings can be essential for the realization of the invention in its various embodiments both individually and in arbitrary combinations.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

We claim:

1. A method for monitoring a control apparatus having at least one pneumatic actuating drive, a valve body, a spindle connected to the valve body, and a positioner, the method comprising the following steps:

a) determining a first valve position ($h_1$) at a first time ($t_1$);

b) producing a force with the actuating drive, on the basis of changes in at least one manipulated variable, resulting in a well-defined, reproducible, uniform movement of the spindle and valve body in a first direction;

c1) modifying the manipulated variable at the output of the positioner in such a way that a resulting force acts on the spindle that reverses the direction of movement of the spindle for the first time, whereby the changes in the variable are likewise well-defined, reproducible and uniform, but act in an opposing, second direction;

c2) determining a second valve position ($h_2$) at a second time ($t_2$), when a first reversal of direction is triggered as a result of step c1;

d) determining a third valve position ($h_2$) at a third time ($t_3$) at which, due to unavoidable delays, the spindle reaches after the first reversal of direction, the third position ($h_2$) having a first defined relationship to the second valve position ($h_2$);

e) defining and determining the first time period (from $t_1$ to $t_{11}$) between the second time ($t_2$) and the third time ($t_3$); and f) comparing the first time period (from $t_1$ to $t_{11}$) with a corresponding first target value for a determination of the operativeness of the control apparatus;

g) maintaining the movement of the spindle after the first time period (from $t_1$ to $t_{11}$) and determining a fourth valve position ($h_4$) at a fourth time ($t_4$), as well as of a fifth valve position ($h_5$) at a fifth time ($t_5$);

h) calculating a first speed of the movement of the spindle from the fourth valve position to the fifth valve position ($h_4$ and $h_5$) over the period from the fourth time to the fifth time ($t_4$ and $t_5$); and i) comparing the first speed with a corresponding second target value, in order to determine the operativeness of the control apparatus.

2. The method of claim 1 further comprising the following steps:

j) producing a force by the actuating drive on the basis of changes in the manipulated variable for the well-defined, reproducible, uniform movement in the second direction without stopping the spindle and valve body;

k1) modifying the manipulated variable for the actuating drive at the output of the positioner in such a way that a resulting force acts on the spindle, reversing the movement of the spindle for a second time, whereby the changes in the manipulated variable are likewise well-defined, reproducible and uniform, but act in the first direction, and k2) determining a seventh valve position ($h_2$) at a seventh time ($t_7$) upon triggering of a second reversal of direction as a result of step k1;

l) determining the eighth time ($t_8$) at which, due to unavoidable delays, the spindle reaches an eighth value position ($h_2$) after the second reversal of direction, said eighth position ($h_2$) having a second defined relationship with the seventh valve position ($h_2$);

m) defining and determining of a second time period (from $t_{III}$ to $t_{IV}$) between the seventh time ($t_7$) and the eighth time ($t_8$); and n) comparing the second time period (from $t_{III}$ to $t_{IV}$) with a corresponding third target value, in order to determine the operativeness of the control apparatus.

3. The method of claim 2 further comprising the following steps:

o) maintaining the movement of the spindle after the second time period (from $t_{III}$ to $t_{IV}$) and determining of an eighth valve position ($h_2$) at an eighth time ($t_8$) and determining a ninth valve position ($h_9$) at a ninth time ($t_9$);

p) calculating a second speed of the movement of the spindle from the eighth valve position ($h_2$) to the ninth valve position ($h_9$) and between the eighth time ($t_8$) and the ninth time ($t_9$); and q) comparing the second speed with a corresponding fourth target value, in order to determine the operativeness of the control apparatus.

4. The method of claim 1 wherein the spindle moves vertically and each of the valve positions are equivalent to a vertical position of the spindle, and the second valve position ($h_2$) represents a same vertical position of the spindle as the third valve position ($h_2$).

5. The method of claim 2 wherein the spindle moves vertically and each of the valve positions are equivalent to a vertical position of the spindle, and the seventh valve position ($h_2$) represents a same vertical position of the spindle as the eighth valve position ($h_2$).

6. The method of claim 2 wherein the spindle moves vertically and each of the valve positions are equivalent to a vertical position of the spindle, the second valve position ($h_2$) wherein the first reversal is triggered corresponds to the seventh valve position ($h_2$) wherein the second reversal is triggered, and whereby the direction of movement during the first reversal of direction is opposed to that during the second reversal of direction.

7. The method of claim 2 wherein the changes in the manipulated variable occurring, respectively, directly before and after the first and second reversal of direction are essentially identical quantitatively and qualitatively.

8. The method of claim 1 wherein the beginning of the first time period ($t_I$) is chronologically spaced from the second time ($t_2$) an equal amount of time that the ending time of the first time period ($t_{II}$) is chronologically spaced from the third time ($t_3$).

9. The method of claim 2 the beginning of the second time period ($t_{III}$) is chronologically spaced from the seventh time ($t_7$) by an amount of time that is equal to an amount of time the ending of the second time period ($t_{IV}$) is chronologically spaced from the eighth time ($t_8$).

10. The method of claim 1 wherein the beginning time ($t_I$) of the first time period essentially coincides with the second time ($t_2$) and the ending time ($t_{II}$) of the first time period essentially coincides with the third time ($t_3$).

11. The method of claim 2 wherein the beginning time ($t_{III}$) of the second time period essentially coincides with the seventh time ($t_7$) and the final time ($t_{IV}$) of the second time period essentially coincides with the eighth time ($t_8$).

12. The method of claim 1 wherein the beginning time of the first speed measurement ($t_4$) essentially corresponds to the third time ($t_3$).

13. The method of claims 3 wherein the beginning time ($t_8$) of the second speed measurement essentially corresponds to the eighth time ($t_8$).

14. The method of claim 2 further comprising a third and fourth reversal of direction, triggered at times ($t_5$ and $t_6$) between the first and second reversal of direction.

15. The method of claim 14 wherein the time ($t_5$) of the triggering of the third reversal of direction essentially coincides with the final time of the measurement of the first speed.

16. The method of claim 1 wherein the method is carried out during a closed loop control of the control apparatus and movement of the spindle and valve body is chronologically monitored, the measurement values for the valve positions and the related times are stored, and, given the occurrence of a reversal of direction, the applicability of the method is checked and executed if warranted.

17. The method of claim 1 wherein the method is executed by temporarily shutting off the normal control operation of the control apparatus, and a test signal forces the movement of the spindle in the first direction.

18. The method of claim 17 wherein the first and second reversal of direction is forced at the second time ($t_2$) and the seventh time ($t_7$) time respectively at which a predetermined valve position ($h_2$) is reached.

19. The method of claim 17 wherein a second test signal brings the valve back into the first valve position ($h_1$).

20. The method of claim 1 further comprising the step of identifying the components of the control apparatus.

21. The method of claim 1 wherein the positioner comprises a sensor for the measurement of valve positions, a microprocessor with a clock pulse, a memory unit and an output unit for error status messages, wherein the valve positions, times and time periods, as well as corresponding target values, can be stored in the memory unit.

22. The method of claim 21 wherein the error status message comprises an indication of the type of the error.

23. The method of claim 21 wherein the microprocessor is connected to the memory unit by a field bus.

24. The method of claim 21 wherein the actuating drive comprises a pneumatic drive which moves the spindle and valve body in the defined uniform movement of the first and second directions with successive pneumatic pulses of a uniform force and duration.

25. The method of claim 21 wherein the positioner comprises an electropneumatic positioner comprising a first valve for communicating air supply pulses to the actuating drive for movement of the spindle and valve body in the first direction and a second valve for extracting air pulses from the actuating drive for movement of the spindle and valve body in the second direction.

26. The method of claim 25 wherein uniform minimum air supply or extraction air pulses, which effect a continuous movement of the spindle, can be produced via the positioner.

* * * * *